United States Patent [19]

Yamamoto et al.

[11] Patent Number: 4,604,800
[45] Date of Patent: Aug. 12, 1986

[54] SEALING CONSTRUCTION FOR A CASING

[75] Inventors: Tadashi Yamamoto, Shiga; Mitsuo Ichiya, Kadoma; Keizo Yamaguchi, Ikeda, all of Japan

[73] Assignee: Matsushita Electric Works, Ltd., Japan

[21] Appl. No.: 625,818

[22] Filed: Jun. 28, 1984

[30] Foreign Application Priority Data

Jun. 28, 1983 [JP] Japan .................. 58-117715

[51] Int. Cl.$^4$ ............................................ B26B 19/38
[52] U.S. Cl. ........................................ 30/41; 30/43.6; 30/DIG. 1
[58] Field of Search .............. 30/41, 41.5, 43.4, 43.5, 30/43.6, DIG. 1; 425/809; 277/88, 135

[56] References Cited

U.S. PATENT DOCUMENTS

| | | | |
|---|---|---|---|
| 1,427,133 | 8/1922 | Taliaferro | 425/809 X |
| 2,506,449 | 5/1950 | Greenwood | 30/41 X |
| 2,752,059 | 6/1956 | Schneider | 425/809 X |
| 2,874,863 | 2/1959 | Unger | 425/809 X |
| 3,675,324 | 7/1972 | Yamada et al. | 30/43.6 |
| 4,363,169 | 12/1982 | Nasu et al. | 30/41 |
| 4,451,980 | 6/1984 | Shirakawa et al. | 30/41 |

FOREIGN PATENT DOCUMENTS 1912106  10/1969  Fed. Rep. of Germany .

Primary Examiner—Jimmy C. Peters
Attorney, Agent, or Firm—Stevens, Davis, Miller & Mosher

[57] ABSTRACT

A sealing construction is disclosed herein for a casing preferably for an electric shaver which is formed by first and second casing members which are to be pressed together through an annular sealing element to provide a seal between the sealing surfaces of the first and second casing members. The first casing member is formed in its sealing surface with an annular groove for retaining the annular sealing element in position, such sealing element being made of elastic material and having an axially projecting and rounded top portion above the sealing surface of the first casing member. Also projected on the second casing member is an annular plug of convex-shaped in cross section which aligns with said annular sealing element so as to be engageable with the rounded top portion thereof. When the first and second casing members are compressed together, the rounded top portion of the sealing element is deformed by being urged by the annular plug in such a way as to wrap around the annular plug both radially inwardly and outwardly thereof, providing an effective seal between the sealing surfaces of said first and second casing members.

6 Claims, 16 Drawing Figures

SEALING CONSTRUCTION FOR A CASING

BACKGROUND OF THE DISCLOSURE

1. Fields of the Invention

This invention is directed to a sealing construction for a casing, more particularly to an improved watertight sealing construction for a casing of an electric shaver.

2. Description of the Prior Art

One known prior sealing construction for a casing for an electric shaver is such that a sealing member in the form of an O-ring is interposed between a pair of associated casing members which are screwed together to provide a watertight seal therebetween, preventing the entry of water in the casing composed of two casing members. Such a sealing member is generally made of an elastic material such as rubber or the like and is designed to abut against generally flat-shaped sealing surfaces of the respective casing members. It has been found, however, in this prior sealing construction, that the sealing member when incorporated in the casing is likely to be deformed to such an extent as to decrease the effectiveness of the seal, thus lowering the sealing performance and allowing the entry of the water into the casing to damage thereby the contents of the casing.

SUMMARY OF THE INVENTION

The above disadvantage has been obviated by the present invention which comprises a case for an electric shaver having an annular sealing element carried on a first casing member in combination with an associated annular protuberance or plug projecting on a second casing member to be engageable with the annular sealing element. The first casing member has an annular groove on its sealing surface for receiving therein the bottom portion of the sealing element so as to project the top portion thereof above the sealing surface of the first casing member. Said sealing element is made of elastic material to have a rounded top portion of generally axially bowed configuration in cross section. On the sealing surface of the second casing member is projected said annular plug which is convex in cross section and aligns with the annular sealing element seated in the groove. When the first and second casing members are fastened together with the sealing element on the first casing member abutting the annular plug, such as by advancing a screw engaging the first and second casing members, the apex of the annular plug will bear forcibly against the rounded top portion of the sealing element in such a way as to urgingly flex or deform it in the direction of wrapping around the radially inwardly and outwardly portion of the annular plug with the result that a highly effective seal is presented between the sealing surfaces of the first and second casing members.

Accordingly, it is a primary object of the present invention to provide a sealing construction for a casing capable of presenting a highly effective seal between the sealing surfaces of the first and second casing members, which is most suitable for watertight sealing purposes.

In a second embodiment of the present invention, the rounded top portion of the sealing element is formed with a plurality of radially spaced rounded projections which are concentric with the sealing element. In this instance, the top portion of the sealing element is deformable in such a way that said projections will sealingly abut the respective portions radially outwardly and inwardly of the annular plug, providing a multi-spot seal between the first and second casing members.

It is therefore another object of the present invention to provide a sealing construction capable of effectuating a more effective seal between the first and second casing members.

In a third embodiment, the sealing element is of hollow construction along the entire circumference thereof such that the stress developed in the sealing element when compressed by the associated annular plug can be uniformly dispersed therein so as to properly deform the top portion of the sealing member around the plug, enhancing the sealing action at one or more sealing contact portions, which is therefore a further object of the present invention.

In a fourth embodiment, said annular groove for reception of the sealing element has its side walls resiliently deformable in lateral or radial directions. This is for preventing excess intrusion of the side walls into the sealing element under the above deformation as well as for preventing excess sealing force appearing at the contacting area of the annular plug with the sealing element, reducing the deterioration of the sealing element made of elastic material.

It is therefore a still further object of the present invention to provide a sealing construction for a casing which prevents the deterioration of the sealing element of elastic material.

In a fifth embodiment, the bottom wall of said annular groove has an axially projecting rounded surface such that a relatively higher compressing force can be concentrated on the center bottom of the sealing element, such compressing force being axially transferred to enhance the compression at the sealing contact portion between the deformed top portion and the annular plug.

It is therefore a further object of the present invention to provide a sealing construction for a casing which has an increased sealing action between the first and second casing members.

In a sixth modification, said annular groove is formed on its side walls respectively with a plurality of annular prongs which extend the entire circumference thereof and said sealing element made of different material from the first casing member is integrally molded therewith to be incorporated in the annular groove at such composite molding. These prongs define respectively on both side walls serrated surfaces which are responsible for firm blending connection between the sealing element and the annular groove, which serves to ensure an effective sealing engagement of the sealing element with the annular plug.

It is therefore still another object of the present invention to provide a sealing construction for a casing which assures a highly effective seal between the annular plug and the sealing element integrally molded with the first casing member but made of different material therefrom.

These and additional objects and advantages of the invention will be more apparent from the following detailed description when taken in conjunction with the attached drawings.

DETAILED DESCRIPTION OF THE EMBODIMENT

Figure 1:
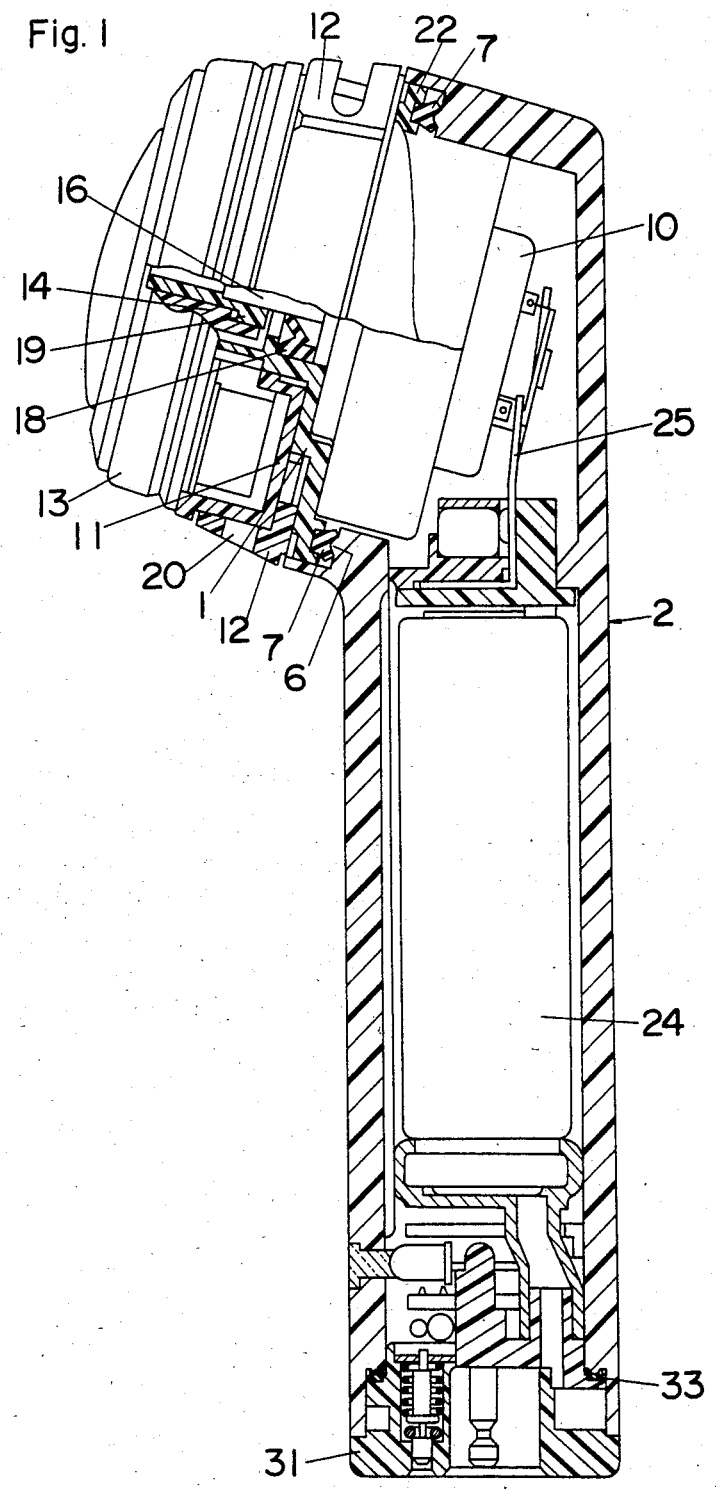
FIG. 1 is a longitudinal section partially in side elevation of a waterproof electric dry shaver to which the present invention is applied.
Figure 2:
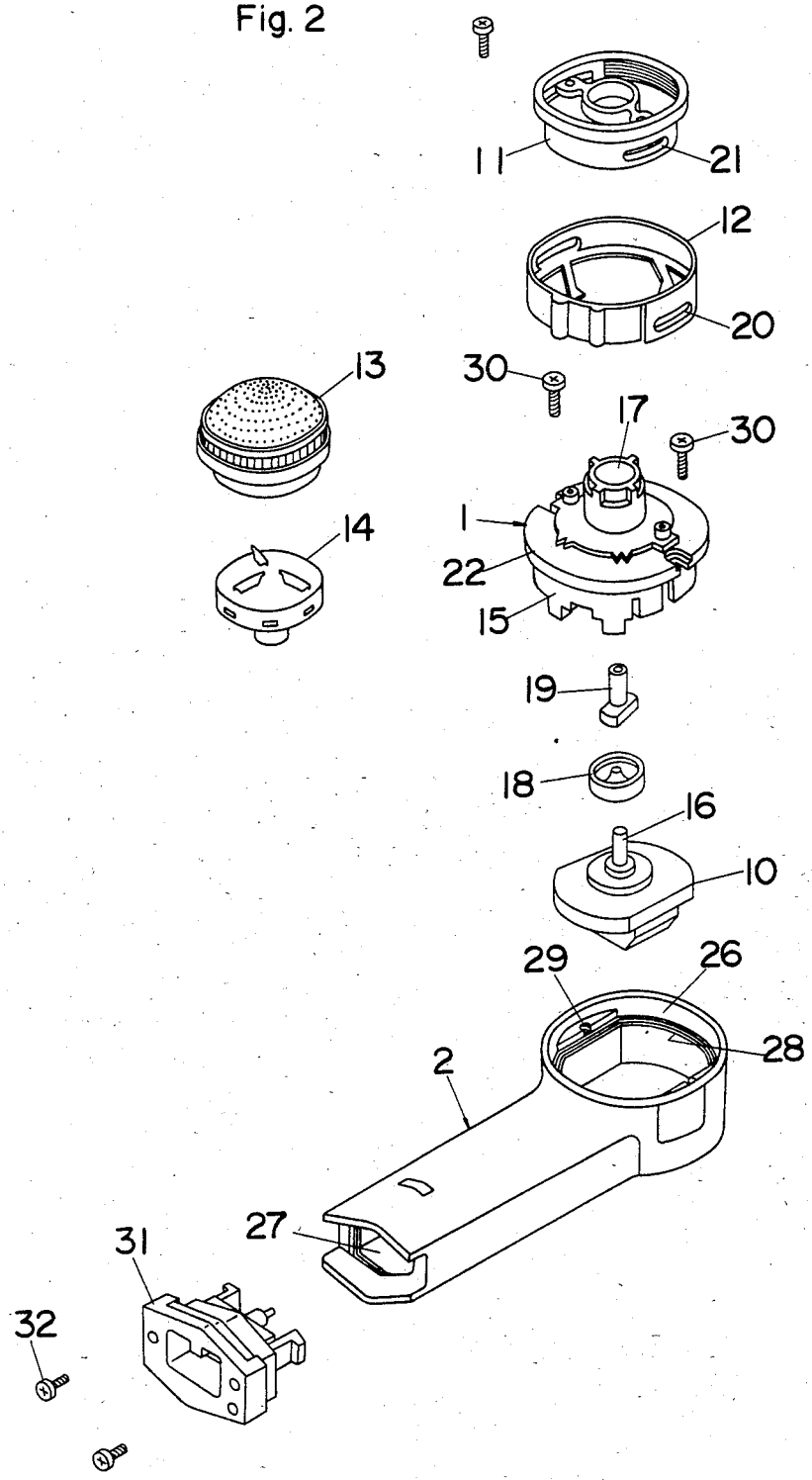
FIG. 2 is an exploded perspective view of various parts constructing the above electric dry shaver.
Figure 3:
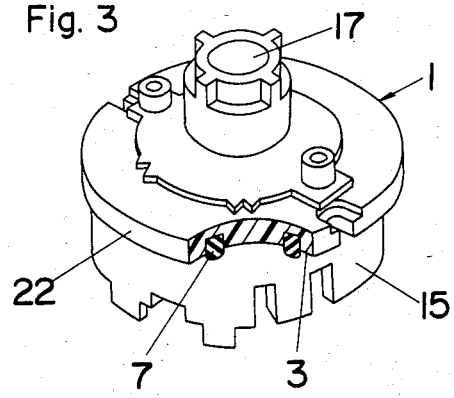
FIG. 3 is a perspective view partially cut away of a first casing with a sealing element employed in the above electric dry shaver.

Referring firstly to FIGS. 1 through 3, there is shown a waterproofed electric dry shaver to which the present invention is applied. The shaver comprises a casing which is composed of first and second casing members 1 and 2 both made of relatively rigid plastic material. The first casing 1 carries thereunder an electric motor 10 and carries thereon a mounting base 11 for an outer blade assembly 13 through a rotatable ring 12 for introducing water for flushing away the remaining whiskers within the space defined between the mounting base 11 and the outer blade assembly 13. The motor 10 is housed within a sleeve 15 with its output shaft 16 extending through an axial bore 17 of the first casing member 1 for connection with an inner blade assembly 14 through a sealing ring 18 and a coupling 19. The sealing ring 18 provides a watertight seal between the output shaft 16 and the inner surface of the axial bore 17 during the rotation of the inner blade assembly 14. Formed in the side wall of said rotatable ring 12 supported on the first casing member 1 to be rotatable about the axis thereof are a pair of diametrically opposed windows 20 which communicate at the one position of the rotatable ring 12 with corresponding slots 21 in the side wall of said mounting base 11 for allowing the water to enter therethrough interior of the mounting base 11 for the above flushing purpose. At the other position of the rotatable ring 12, the slots 21 are closed by the side wall of the ring 12. The upper end of said sleeve 15 terminates in a radially outwardly extending flange 22 of the first casing member which defines thereunder a first sealing surface 3 to be engaged with an associated sealing surface 4 of the second casing member 2.

The second casing member 2 is for accommodating an electric battery 24 for electrical connection with the motor 10 through leads 25 and is formed with a front opening 26 and a rear opening 27. It is this front opening 26 that receives said first casing 1. The front opening 26 is defined or surrounded by a peripheral wall which has an integral stepped-down rim 28 extending interiorly thereof to define thereon the second sealing surface 4 with which said first sealing surface 3 of the first casing member 1 is sealingly engaged. Positioned at the portion radially outwardly of the rim 28 are holes 29 for receiving screws 30 which fasten tightly the first casing member 1 to the second casing member 2 in a sealing manner as is fully discussed hereinafter. A bottom closure 31 is fastened by screws 32 to the second casing member 2 through a sealing ring 33 so as to sealingly close the rear opening 27 thereof, such sealing ring 33 being integrally molded with the second casing member 2 by a known composite molding method.

Figure 4:
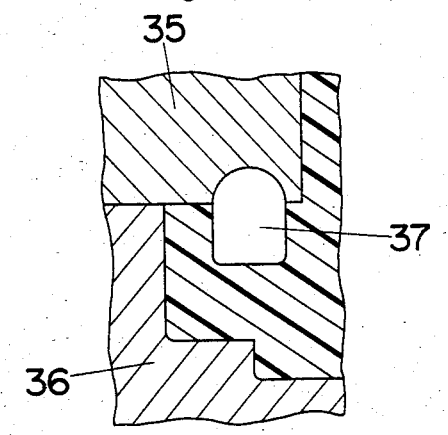
FIG. 4 is a sectional view illustrating molds employed for producing the first casing member of composite molded type incorporating therein the sealing element made of different material from the first casing member.

The sealing construction of the present invention is to be focused on the connection between the first and second casing members 1 and 2 and is established by a unique combination of an annular sealing element 7 on the sealing surface 3 of the first casing member 1 and an annular plug 6 on the sealing surface 4 of the second casing member 2. The sealing element 7 is made of an elastic thermoplastic material such as olefin, polyester or styrene resin to have a rounded or bowed top portion when viewed in cross section, and is received in an annular groove 5 in the first sealing surface 3 with its top portion projecting above the sealing surface 3, such top portion of the sealing element 7 is compressed by the associated annular plug 6, when the first and second casing members 1 and 2 are fastened, to be elastically deformed thereby for providing a continuous seal between the first and second casing members 1 and 2. Said sealing element 7, like the sealing ring 33 at the rear opening 27 of the second housing 2, is preferably molded integrally with the first casing member 1 by a composite molding method, which is now briefly explained with reference to FIG. 4. That is, the first casing member 1 after being molded between separate molds is placed between a movable mold 35 and the common fixed mold 36 to form therebetween a cavity 37 to be filled with the material forming the above sealing element 7. A detailed description of this seal will be given in accordance with various preferred embodiments disclosed hereinafter.

Figure 5:
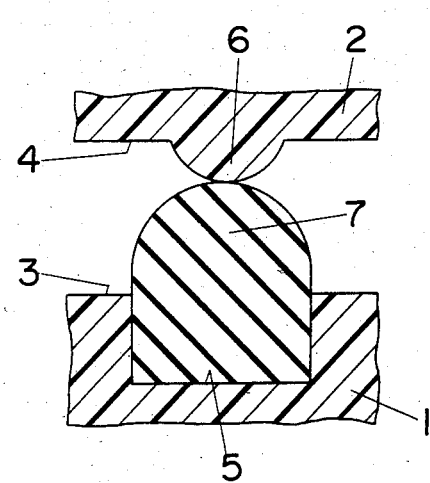
FIG. 5 is an enlarged sectional view illustrating the relationship between the first and second casing members prior to establishing the seal therebetween according to a first embodiment of the present invention.
Figure 6:
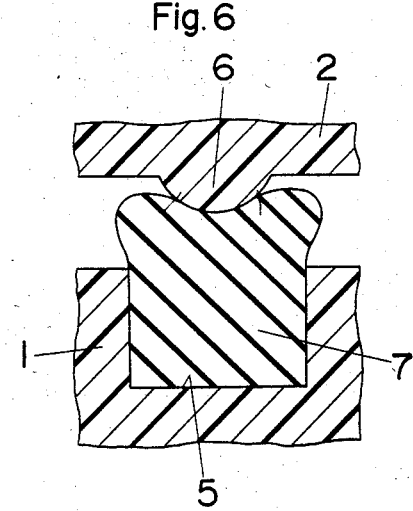
FIG. 6 is an enlarged sectional view illustrating the relationship between the first and second casing members when they are pressed together in the first embodiment.

First embodiment <FIGS. 5 and 6>

Prior to describing the detailed sealing construction of the present invention, it is noted that the annular plug 6 is of the same configuration throughout the following embodiments. That is, the annular plug 6 is integrally formed on the sealing surface 4 or the stepped-down rim 28 of the second casing member 2 to be convex in cross section and is therefore rigid relative to the corresponding sealing element. The sealing element 7 in this embodiment has a bottom portion of rectangular cross section which is received in the corresponding contoured groove 5. The top portion of the sealing element 7 is of semicircular cross section with the apex of which is in alignment with the apex of the annular plug 6, as best shown in FIG. 5, where the first and second casing members 1 and 2 are not fastened tightly by the screws 30 of FIG. 2 and therefore no compressing force is applied between the sealing element 7 and the annular plug 6. When the first and second casing members 1 and 2 are tightened together by advancing the screws 30, the top portion of the sealing element 7 will be elastically deformed in such a way as to wrap around the annular plug 5 at the portions radially outwardly and inwardly thereof, providing an effective seal between the first and second casing members 1 and 2. The sealing element 7 may be of course forced into the groove 5 in the separately molded first casing member 1.

Figure 7:
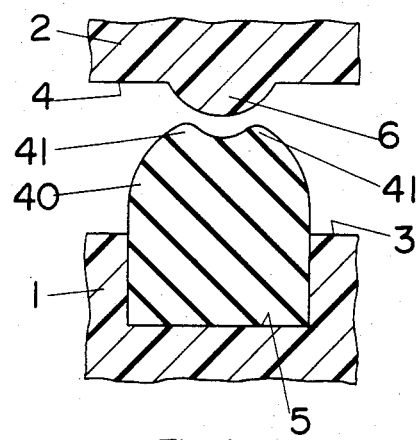
FIGS. 7 and 8 are enlarged sectional views illustrating the relationship according to a second embodiment in corresponding manners respectively to FIGS. 5 and 6.
Figure 8:
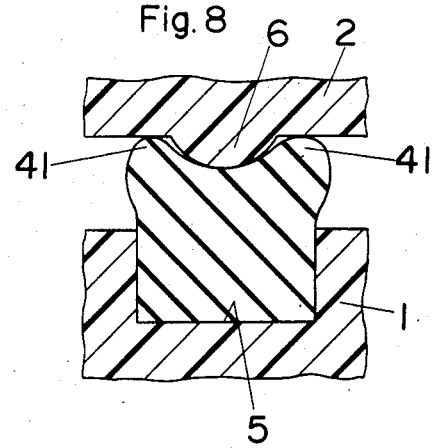

Second Embodiment <FIGS. 7 and 8>

The sealing element 40 in this embodiment is formed to have a pair of radially spaced rounded projections 41 on the top surface of the generally rounded top portion above the sealing surface 3. When compressed by the annular plug 6, the sealing element 40 initially comes into abutting engagement at its recess defined between the projections 41 with the apex of the annular plug 6 and then finally deforms in the same manner as in the above first embodiment to wrap around the annular plug 6 except that it is subject to more deformation to such an extent that the projections 41 are sealingly engaged with the sealing surface 4 of the second casing member 2 at the portion radially outwardly and inwardly of the plug 6. With this result, a highly effective seal between the first and second casing members 1 and 2 can be obtained. Also with this arrangement, possible minor shifting of the annular plug 6 with respect to the sealing element 40 can be compensated to assure the effective seal.

Figure 9:
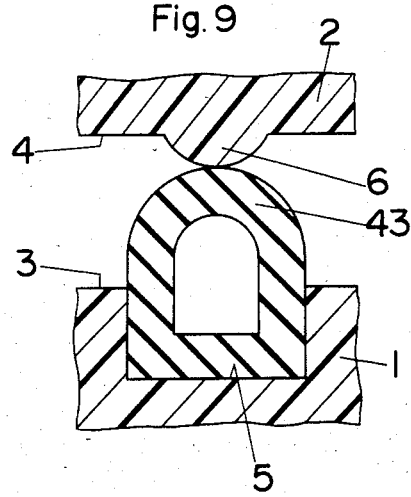
FIGS. 9 and 10 are enlarged sectional views illustrating the relationship according to a third embodiment in corresponding manners respectively to FIGS. 5 and 6.
Figure 10:
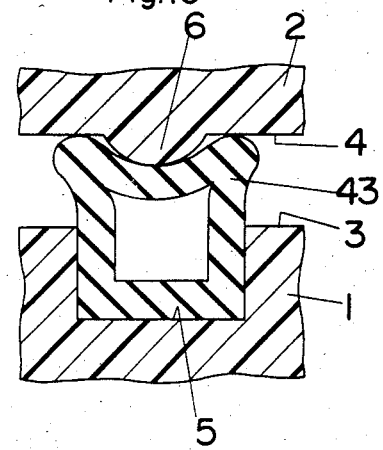

Third Embodiment <FIG. 9 and 10>

The sealing element 43 in this embodiment is of a hollow construction along the entire circumference thereof with a generally uniform thickness in all cross sections. By the use of this sealing element 43 of hollow construction, the internal compressing stresses developed within the sealing element 43 at the time of being compressed by the annular plug 6 can be dispersed to avoid a local stress concentration, whereby the top portion of the sealing element 43 is properly deformed so as to conform with the contour of the annular plug 6. This enhances the sealing action between the first and second casing members 1 and 2. In addition, as best shown in FIG. 10, the sealing element 43 is subject to more deformation so that it can be in sealing abutment with the sealing surface of the second casing member 1 not only at the annular plug 6 but also at the portions of the casing 2 which are radially outwardly and inwardly thereof, enhancing the effectiveness of the seal.

Figure 11:
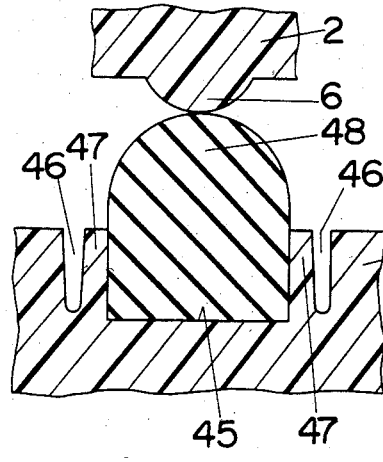
FIGS. 11 and 12 are enlarged sectional views illustrating the relationship according to a fourth embodiment in corresponding manners respectively to FIGS. 5 and 6.
Figure 12:
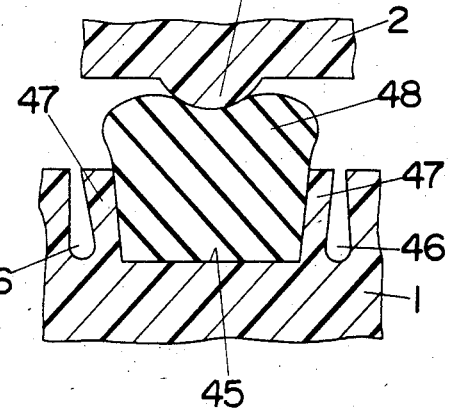

Fourth Embodiment <FIG. 11 and 12>

In this embodiment, the first casing member 1 is formed in its sealing surface at the respective portions spaced radially outwardly and inwardly of the annular groove 45 with vertical slits 46 of annular configuration concentric with the groove 45 so that there are defined between the respective slits 46 and the groove 45 resilient lips 47 capable of being flexed radially. The sealing element 48 is of the same configuration as in the first embodiment and is received within the groove 45 at its bottom portion which is of generally rectangular cross section. When the sealing element 48 is compressed by the annular plug 6 to be deformed in the same manner as in the first embodiment for sealing purpose, said resilient lips 47 will flex radially to release the internal compression stresses accumulated in the sealing element 48 to such an extent as to prevent the deterioration of the sealing element 48 while maintaining the effective seal between the sealing element 48 and the annular plug 6. In addition, the resilient lips 47 when being flexed into the corresponding slits 46 act to eliminate excess force applied to the side wall of the groove 45 and therefore prevent the side walls of the groove 45 from projecting into the sealing element 48, whereby the deterioration of the sealing element 48 can be avoided also in this respect.

Figure 13:
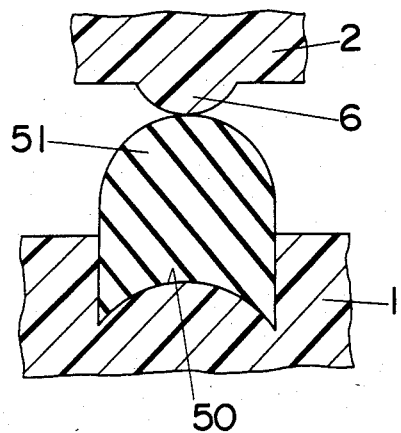
FIGS. 13 and 14 are enlarged sectional views illustrating the relationship according to a fifth embodiment in corresponding manners respectively to FIGS. 5 and 6.
Figure 14:
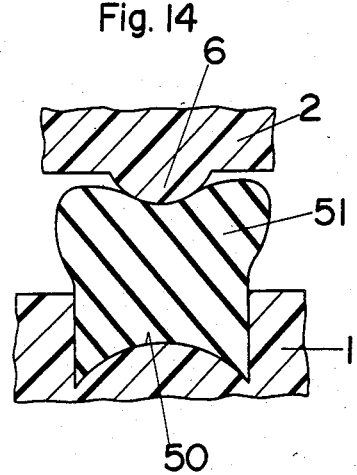

Fifth embodiment <FIGS. 13 and 14>

The annular groove 50 in the first casing member 1 is configured to have an upwardly bowed bottom surface with which the correspondingly shaped bottom surface of the sealing element 51 is in continuous abutting engagement. Thus, the center bottom portion of the sealing element 51 receives more compressing force than at the peripheral regions, such compressing force being in turn applied to the contacting portion of the sealing element 51 with the annular plug 6 so as to increase the effectiveness of the seal between the first and second casing members 1 and 2.

Figure 15:
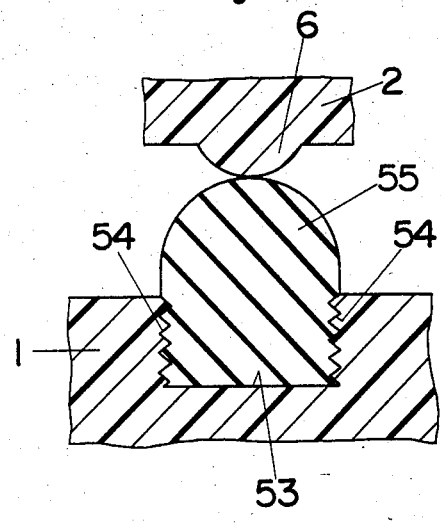
FIGS. 15 and 16 are enlarged sectional views illustrating the relationship according to a sixth embodiment in corresponding manners respectively to FIGS. 5 and 6.
Figure 16:
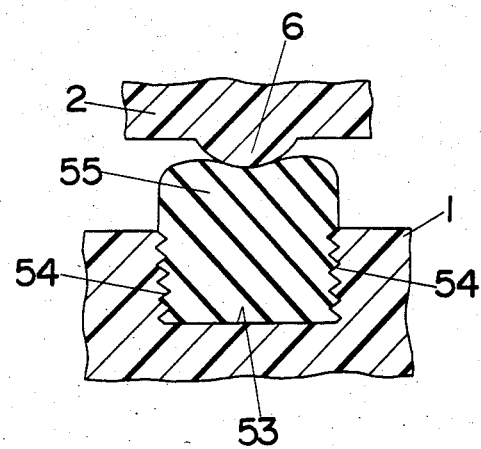

Sixth embodiment <FIGS. 15 and 16>

In this embodiment, both side walls of the groove 53 are formed with a plurality of circumferentially extending and vertically aligned annular prongs 54 which define serrated surfaces on both side walls of the groove 53. The resulting serrated surfaces will result in firmly holding the sealing element 55 in proper position, ensuring secure sealing abutment of the sealing element with the annular prongs 54. Particularly worthy of mention in this instance is the advantageous feature that the sealing element when molded integrally with the first casing member 1 can be most firmly secured to or incorporated in the first casing member 1.

The above description and particularly the drawings are set forth for purposes of illustration only. It will be understood that many variations and modifications of the embodiments herein described will be obvious to those skilled in the art, and may be carried out without departing from the spirit and scope of the invention.

What is claimed is:

1. A seal construction between first and second casing members of a case for an electric shaver comprising:
   a first sealing surface having an annular groove therein;
   an annular elastic sealing member having a bottom portion conforming with and seated in said groove and a top portion which is rounded in cross section and projects above said first sealing surface;
   a second sealing surface facing toward said first sealing surface and having an annular protuberance aligned with the rounded top portion of the sealing member, said annular protuberance being more rigid than said sealing member, said annular protuberance having a radius of curvature in cross section, said radius being less than a radius of curvature of said top portion of said sealing member in cross section;
   means for pressing said annular protuberance against said annular sealing member to cause deformation thereof around its circumference so that the top portion of the sealing member is deformed around the annular protuberance both radially inwardly and outwardly thereof.

2. The seal of claim 1 wherein the top portion of said sealing member is formed with at least two radially spaced rounded porjections which are concentric with the sealing element.

3. The seal of claim 1 wherein said sealing member is of a closed hollow construction along the entire circumference thereof.

4. The seal of claim 1 wherein the side walls of said annular goove are resiliently deformable in lateral directions.

5. The seal of claim 1 wherein the bottom wall of said annular groove has an axially projecting rounded surface.

6. The seal of claim 1 wherein said annular groove has in at least one of its side walls a plurality of annular prongs which extend substantially the entire circumference thereof and wherein said sealing element is made of different material from the first casing member and is integrally molded with the first casing member so as to be incorporated in the annular groove thereof.

* * * * *